(12) United States Patent
Hoop et al.

(10) Patent No.: US 9,687,916 B2
(45) Date of Patent: Jun. 27, 2017

(54) DRILL BIT WITH AN EXCHANGEABLE CUTTING PORTION

(71) Applicant: Hilti Aktiengesellschaft, Schaan (LI)

(72) Inventors: Matthaeus Hoop, Eschen (LI); Christoph Weber, Neuheim (CH); Joerg Ebert, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 252 days.

(21) Appl. No.: 14/367,806

(22) PCT Filed: Dec. 21, 2012

(86) PCT No.: PCT/EP2012/076731
§ 371 (c)(1),
(2) Date: Jun. 20, 2014

(87) PCT Pub. No.: WO2013/093041
PCT Pub. Date: Jun. 27, 2013

(65) Prior Publication Data
US 2015/0328695 A1 Nov. 19, 2015

(51) Int. Cl.
*B23B 51/04* (2006.01)
*B28D 1/04* (2006.01)
(52) U.S. Cl.
CPC ...... *B23B 51/0466* (2013.01); *B23B 51/0406* (2013.01); *B23B 51/048* (2013.01); *B23B 51/0473* (2013.01); *B28D 1/041* (2013.01); *B23B 2251/02* (2013.01); *B23B 2251/46* (2013.01); *B23B 2251/50* (2013.01);
(Continued)

(58) Field of Classification Search
CPC ............ B23B 51/0466; B23B 51/0473; B23B 51/048; B28D 1/041; Y10T 408/895
See application file for complete search history.

(56) References Cited

U.S. PATENT DOCUMENTS

| 1,813,375 A | 7/1931 | Wright et al. |
| 1,855,873 A | 4/1932 | Shortell |

(Continued)

FOREIGN PATENT DOCUMENTS

| DE | 21 30 728 A1 | 12/1971 |
| EP | 0 378 964 B1 | 7/1990 |

(Continued)

OTHER PUBLICATIONS

Chinese Office Action issued in counterpart Chinese Application No. 201280067821.6 dated Aug. 4, 2015 (Two (2) pages).

(Continued)

*Primary Examiner* — Eric A Gates
(74) *Attorney, Agent, or Firm* — Crowell & Moring LLP

(57) ABSTRACT

A drill bit which is rotatable about a drilling axis is disclosed. The drill bit has a drill shaft section having a first plug-connecting element and a cutting section having a second plug-connecting element. The first plug-connecting element and the second plug-connecting element form a plug connection. The cutting section includes a plurality of cutting subsections each having a ring subsection and at least one cutting segment, wherein each ring subsection together with the first plug-connecting element forms the plug connection and is connectable to the first plug-connecting element by a pin connection.

11 Claims, 4 Drawing Sheets

(52) U.S. Cl.
CPC ........ *Y10T 408/892* (2015.01); *Y10T 408/895* (2015.01); *Y10T 408/9098* (2015.01)

(56) References Cited

U.S. PATENT DOCUMENTS

| | | | |
|---|---|---|---|
| 2,326,908 A | | 8/1943 | Williams, Jr. |
| 3,382,743 A | | 5/1968 | Trevathan |
| 3,610,768 A | * | 10/1971 | Cochran ............. B23B 51/0466 125/20 |
| 3,878,906 A | | 4/1975 | Guest |
| 3,888,320 A | | 6/1975 | Maxwell |
| 3,999,620 A | * | 12/1976 | Watson ............... B23B 51/0406 175/403 |
| 4,500,234 A | * | 2/1985 | Orth ...................... B23B 51/042 408/204 |
| 4,968,192 A | * | 11/1990 | Hamilton ............ B23B 51/0466 407/33 |
| 5,451,128 A | * | 9/1995 | Hattersley ........... B23B 51/0466 407/107 |
| 6,007,279 A | * | 12/1999 | Malone, Jr. ......... B23B 51/0433 144/150 |
| 7,628,228 B2 | * | 12/2009 | Drivdahl ................. E21B 10/02 175/403 |
| 7,641,004 B2 | * | 1/2010 | Lapointe ................ B28D 1/041 175/405.1 |
| 9,120,162 B2 | * | 9/2015 | Keightley ........... B23B 51/0433 |
| 2007/0036620 A1 | | 2/2007 | Keightley |
| 2010/0200304 A1 | | 8/2010 | Gosamo et al. |

FOREIGN PATENT DOCUMENTS

| | | |
|---|---|---|
| EP | 0 428 476 A1 | 5/1991 |
| FR | 2.097.340 A5 | 3/1972 |
| RU | 2 237 148 C2 | 9/2004 |
| SU | 392240 A2 | 7/1973 |
| WO | WO 90/15683 A1 | 12/1990 |

OTHER PUBLICATIONS

PCT/EP2012/076731, International Search Report dated Feb. 20, 2013 (Three (3) pages).
German Office Action dated Nov. 27, 2012 (Three (3) pages).
U.S. Patent Application, "Drill Bit with an Exchangeable Cutting Portion", filed Jun. 20, 2014, Inventor Matthaeus Hoop, et al.
Russian Office Action issued in Russian counterpart application No. 2014129890/02(048123) dated Oct. 28, 2016 (Eight (8) pages).

* cited by examiner

DRILL BIT WITH AN EXCHANGEABLE CUTTING PORTION

This application claims the priority of International Application No. PCT/EP2012/076731, filed Dec. 21, 2012, and German Patent Document No. 10 2011 089 546.9, filed Dec. 22, 2011, the disclosures of which are expressly incorporated by reference herein.

TECHNICAL FIELD

The present invention relates to a drill bit having an exchangeable cutting section.

PRIOR ART

Drill bits consist of a cutting section with one or more cutting segments, a drill shaft section, and a receiving section with a plug-in end, by means of which the drill bit is fastened in the tool receptacle. In drilling operation, the drill bit is rotated about a drilling axis and creates a borehole in a workpiece to be machined. In drilling operation, the receiving section is fastened in the tool receptacle of the drilling machine and the cutting section is facing the workpiece to be machined. The drill shaft section is situated between the cutting section and the receiving section and is connected directly to both drill bit sections. The term "drill bit section" is understood to refer to the individual sections of the drill bit, which may be designed as the cutting section, the drill shaft section or the receiving section.

EP 0 428 476 A1 discloses drill bits having a drill shaft section and a replaceable cutting section. The drill shaft section and the cutting section of the drill bit are joined together by means of a combined plug-and-solder connection. The term "combined plug-and-solder connection" refers to connections of two connecting elements, which first form a plug connection that is form-fitting in at least one direction; then the connecting elements, having been plugged together, are soldered to one another. The cutting section has an outer connecting element and the drill shaft section has an inner connecting element, wherein the inner and outer connecting elements are designed in a ring shape with a closed cross section. The connecting elements are plugged into one another and then soldered to one another. The inner connecting element is 2% to 10% longer than the outer connecting element and, at one end face, is in contact with a contact face of the outer connecting element.

There is a gap, which is filled with solder, between the connecting elements that have been plugged into one another. The solder melts when the connecting elements are heated, forming a soldered connection between the connecting elements that are plugged together.

US 2010/200304 A1 discloses another known drill bit, consisting of a replaceable cutting section, a drill shaft section, and a receiving section, wherein the cutting section and the drill shaft section are joined together by means of a combined plug-and-solder connection. The cutting section comprises an open ring section and several cutting segments that are connected permanently to the ring section. Deviations in the dimensions of the drill shaft section are compensated by the open ring section with a narrow gap between the ends of the ring section. The cutting section comprises an outer connecting element and the drill shaft section comprises an inner connecting element, which are plugged into one another and then soldered to one another. The inner connecting element of the drill shaft section is designed in a ring shape and has a closed cross section; the outer connecting element of the cutting section is designed in a ring shape with an open cross section. The ring section has several continuous boreholes along its circumference, these boreholes being situated at least partially in the outer connecting element. The boreholes support the distribution of solder into the interspaces between the inner and outer connecting elements through capillary action.

To replace the cutting section on the known drill bits having a combined plug-and-solder connection, the soldered connection between the drill shaft section and the cutting section is destroyed, a new cutting section is placed on the drill shaft section, and then the drill shaft section and the new cutting section are soldered to one another. Drill bits with a combined plug-and-solder connection have the disadvantage that a heat source and a soldering device are required to destroy the soldered connection between the worn cutting section and the drill shaft section and to create a new soldered connection between the new cutting section and the drill shaft section. Therefore, the known drill bits having a combined plug-and-solder connection are not suitable for rapid replacement of the cutting section at the construction site. Replacement of the cutting section is possible only with a proper tool in the form of a heat source and a solder source.

Combined plug-and-solder connections between the drill shaft section and the cutting section have another disadvantage in the case of cutting segments soldered to the cutting section. The soldered connection of the cutting segments on the cutting section can be released by heating the connecting element. To ensure that the zone of heat influence does not include the cutting segments, the cutting section must have a certain height. On the other hand, the height of the cutting section should be as small as possible to reduce costs. When the cutting segments are worn, the cutting section is removed from the drill shaft section and discarded. The smaller the height of the ring section, the lower the cost of materials for the ring sections.

DESCRIPTION OF THE INVENTION

The object of the present invention is thus to further develop a drill bit having a replaceable cutting section to the extent that the equipment costs for the user in replacing the cutting section are reduced. Furthermore, when replacing a cutting section, the risk that the connection of the cutting segments to the ring section might be damaged is reduced.

According to the invention, it is provided that the cutting section has several cutting subsections, each having a ring subsection and at least one cutting segment, wherein each ring subsection forms a plug connection with the first plug-connecting element and can be connected to the first plug-connecting element by a pin connection. The cutting subsections and the drill shaft section can be secured to prevent twisting and displacement relative to one another by means of the additional pin connections. A pin connection has the advantage that it can be designed to be releasable, so that the user can replace a cutting subsection with little effort.

A plug connection is defined as a connection, in which two plug-connecting elements, which are referred to as the first and second plug-connecting elements, are guided along a plug-in direction and form a connection that is form-fitting in at least one direction. A pin connection is defined as a connection in which two connection partners are joined together by a pin element. The pin elements also include screws and rivets, among other things. In the sense of the present invention, a screw is a pin element having an outside thread that forms a force-locking connection with a matching inside thread on a receiving bore; the additional threaded connection secures the pin element in the receiving bore. In the sense of the present invention, a rivet is a plastically deformable pin element having a swage head and a closing head. The rivet is inserted into a receiving bore designed as a through-hole, until the swage head is in contact with the connecting element. Next, the protruding end is shaped to the closing head by application of pressure, for example, by a hammer strike or by a press. After deformation, the rivet forms a force-locking connection with the receiving bore.

The first and second plug-connecting elements preferably form a plug connection with an outer plug-connecting element and an inner plug-connecting element. A plug connection having an inner plug-connecting element and an outer plug-connecting element secures the cutting subsections against rotation about the drilling axis and can be opened and closed easily by the user. Furthermore, the drill bit sections that are connected by means of the connecting elements are aligned accurately with one another.

The outside diameter of the outer plug-connecting element is smaller than or equal to the outside diameter of a cutting circle, formed by the cutting segments, and the inside diameter of the inner plug-connecting element is greater than or equal to the inside diameter of the cutting circle. The inside diameter and the outside diameter of the cutting circle determine the diameter of the borehole in the workpiece and the diameter of the drill core. To ensure the functionality of the drill bit in core drilling in the workpiece, the combined plug-and-pin connection of the drill bit must not be less than the inside diameter of the cutting circle and must not be exceed the outside diameter of the cutting circle.

A recess that can be filled with an anticorrosion agent is preferably provided in one or more ring subsections and/or in the first plug-connecting element. The plug connection is held slidingly by the recess by the anticorrosion agent and the functionality is improved. The anticorrosion agent is particularly important when a cooling and drilling fluid, which can cause corrosion between the plug-connecting elements and thus limit the releasability of the plug connection, is used in core drilling.

Each pin connection preferably has at least one receiving bore and at least one pin element, wherein the pin element can be inserted into the receiving bore. The geometry of the receiving bores and the geometry of the pin element are mutually coordinated. The pin elements are designed to be cylindrical, for example, with a round or elliptical cross section or a conical taper.

At least one receiving bore is particularly preferably designed to be as deep as or deeper than at least one pin element. This design of the receiving bore ensures that the pin elements do not protrude with respect to the inside or the outside of the drill shaft section.

In a first embodiment, the pin element is designed to be loose, and the receiving bore passes completely through one of the plug-connecting elements and at least partially through the other plug-connecting element. A pin element that is designed to be loose can be replaced easily by a new pin element.

In a first variant, the receiving bore does not pass completely through the other plug-connecting element. The fact that the receiving bore penetrates only partially but not completely through the plug-connecting element prevents the pin element from falling out. Furthermore, the bottom of the receiving bore may serve as a mating face for the pin element for a magnetic pin connection.

The other plug-connecting element in particular preferably has an opening, which connects the receiving bore to the inside or the outside of the drill bit, wherein the opening is designed to be smaller than the receiving bore. Through the opening, the pin element is accessible from the inside or outside of the drill bit and can be removed from the receiving bore by using a suitable tool, so that the pin connection can easily be released by the user.

In a second variant, the receiving bore passes completely through the other plug-connecting element. Continuous receiving bores have the advantage that the receiving bores are accessible from the inside or the outside, and the pin connections can be released easily by the user. The receiving bore preferably has a conical taper. Due to the conical shape of the receiving bores and pin elements, there is no risk of the pin elements slipping through to the inside or the outside.

In a preferred variant, the pin connections are designed as releasable connections. A connection is defined as being releasable if the connection can be released by the user without destroying it, such as a plug connection, a screw connection or a magnetic connection, for example. The pin connections are particularly preferably designed as magnetic pin connections, wherein the pin element or one of the connecting elements is designed as a permanent magnet. If the pin element is designed as a permanent magnet, the connecting element must be ferromagnetic, and if the connecting element is designed as a permanent magnet, the pin element must be ferromagnetic. Magnetic pin connections have the advantage that the pin elements are reusable, and the pin elements create a known retaining force. In the case of a magnetic pin connection, the user can easily and quickly replace one cutting section with a new cutting section. To remove the old cutting section, the pin elements are removed from the receiving bores and the plug connection is released between the cutting sections. The drill bit sections are inserted one into the other, and the pin elements, which are designed as permanent magnets, are inserted into the through-bores of the outer connecting element. Next, the outer connecting element is rotated about the inner connecting element until the pin elements engage in the receiving bores of the inner connecting element. The engagement of the pin elements can be heard audibly by the user due to the magnetic forces. Magnetic pin connections have the advantage that the boreholes in the inner and outer connecting elements need not be aligned accurately with one another by the user when replacing a cutting section, but instead, accurate alignment is accomplished by rotation of the drill bit section and locking the pin elements in the receiving bores.

The pin elements can preferably be clamped in the receiving bores. The receiving bore here is preferably designed as a transverse slot of various widths, and the pin element is inserted into the transverse slot. By means of a rotational movement about the drilling axis, the pin element is rotated in the transverse slot until the pin element is clamped in the transverse slot.

The magnetic pin elements can preferably be combined with the clamp able pin elements. This combination is suitable for applications of the drill bit in which the magnetic force is greatly reduced due to high temperatures, for example. In this case, the clamped pin element secures the cutting section on the drill shaft section. The magnetic design of the pin element has the advantage that the pin element is secured on insertion of the pin element into the receiving bore.

In an alternative embodiment, the pin element is secured on one of the plug-connecting elements, and the receiving bore passes completely through the other plug-connecting element. The pin element can then be clamped in the receiving bore. The receiving bore is preferably designed as a transverse slot of various widths. The pin element is inserted into the transverse slot and is rotated in the transverse slot by a rotational movement about the drilling axis until the pin element is clamped in the transverse slot.

The receiving bore is in particular preferably connected to a connecting slot in the plug-connecting element, wherein the receiving bore and the connecting slot are designed in the form of a T-shaped groove. To be able to insert the pin element into the receiving bore, a connecting slot, which is connected to the receiving bore, is provided in the plug-connecting element. The receiving bore and the connecting slot are designed in the form of a T-shaped groove. The T-shaped groove has the advantage over an L-shaped groove that it reduces the risk of unintentional loosening of the cutting section. When a drill bit has become clamped in the substrate, the user attempts to loosen the drill bit from the substrate by moving it back and forth about the drilling axis.

In a preferred embodiment, a guide section is preferably situated between the cutting segments and the drill shaft section, wherein the guide sections are connected to the cutting segments, so that they are at least partially flush with the inside and/or the outside. Due to the flush connection of the guide sections to the cutting segments, the guide sections form a guide for the cutting segments, when drilling with the drill bit, and thus stabilize the cutting segments. The guidance by means of the guide section may be accomplished on the outside of the drill bit over the substrate surrounding the borehole or on the inside of the drill bit over the drill core.

The guide sections are in particular preferably connected to the cutting segments so that they are at least partially flush with the outside and are designed at least partially as an outer plug-connecting element of the plug connection. Alternatively or additionally, the guide sections are connected to the cutting segments so they are at least partially flush with the inside and are designed at least partially as an inner plug-connecting element of the plug connection.

Exemplary Embodiments

Exemplary embodiments of the invention are described below with reference to the drawings. These exemplary embodiments are not necessarily drawn to scale and instead the drawings are presented in a schematic and/or slightly distorted form in cases where this serves the purpose of illustration. With regard to additions to the teachings as directly discernible from the drawings, reference is made to the relevant prior art. It should be taken into account here that, without going beyond the general idea of the invention, various modifications and changes are possible with regard to the shape and details of an embodiment. The features of the invention that are disclosed in the description, the drawings and the claims may be essential to this refinement of the invention, either individually or in any combination. Furthermore, all combinations of at least two of the features disclosed in the description, the drawings and/or the claims fall within the scope of the invention. The general idea of the invention is not limited to the precise shape or the details of the preferred embodiments described below, nor is it limited to one object that would be restricted in comparison with the object claimed in the claims. In the case of the given dimension ranges, values within the aforementioned limits should also be disclosed as limit values and may be used and claimed in any form. For the sake of simplicity, the same reference notation is used below for identical or similar parts or for parts having an identical or similar function.

DETAILED DESCRIPTION OF THE DRAWINGS

Figure 1:
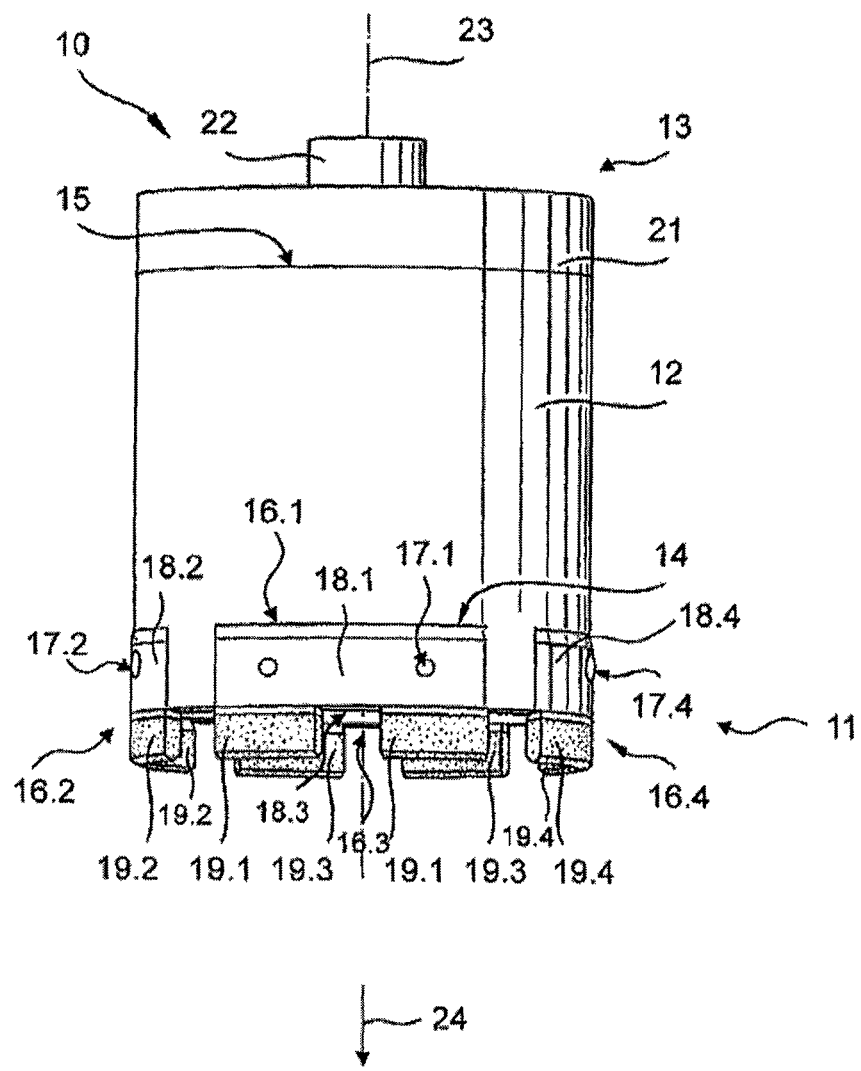
FIG. 1 shows a drill bit according to the invention consisting of a drill shaft section and a replaceable cutting section with four cutting subsections, which are connected to the drill shaft section by way of combined plug-and-pin connections.

FIG. 1 shows a drill bit 10 according to the invention, consisting of a replaceable cutting section 11, a drill shaft section 12 and a receiving section 13 in a three-dimensional diagram. The cutting section 11 is connected to the drill shaft section 12 by means of a first connection 14, and the drill shaft section 12 is connected to the receiving section 13 by means of a second connection 15.

The first connection 14 is a combined plug-and-pin connection designed to be releasable, and the second connection 15 is designed as a non-releasable connection in the form of a welded connection in the exemplary embodiment shown in FIG. 1. The term "combined plug-and-pin connection" refers to connections of two connecting elements which form at least one plug connection which is form-fitting in at least one direction. Then the connecting elements that have been plugged together are connected by means of a pin element. A connection is defined as releasable if the connection can be released without destruction such as a plug connection, a screw connection or a magnetic connection, for example. A connection is defined as non-releasable if the connection can be released only by destroying the connecting means such as a soldered connection, a welded connection, a riveted connection, or an adhesive connection, for example.

The cutting section 11 comprises four cutting subsections 16.1, 16.2, 16.3, 16.4 which are connected to the drill shaft section 12 by means of combined plug-and-pin connections 17.1, 17.2, 17.3, 17.4. The four cutting subsections 16.1-16.4 each consist of a ring subsection 18.1, 18.2, 18.3, 18.4 and two cutting segments 19.1, 19.2, 19.3, 19.4 which are connected to the respective ring subsections 18.1-18.4. The cutting segments 19.1-19.4 are welded, soldered, or screwed to the ring subsections 18.1-18.4 or attached to the ring subsections 18.1-18.4 by some other suitable type of fastening.

The receiving section 13 comprises a cover 21 and an insertion end 22 by means of which the drill bit 10 is fastened in the tool receptacle of a drilling machine. During a drilling operation, the drill bit 10 is rotated about a drilling axis 23 by the drilling machine and is moved in a drilling direction 24 parallel to the drilling axis 23 into the workpiece to be machined. The forward movement is accomplished manually by the operator in the case of a hand-guided drilling or, in the case of a stand-guided drilling machine, by means of a feed mechanism, wherein the feed mechanism may be designed as a hand wheel or as a motor drive.

The cutting subsections 16.1-16.4 each have two cutting segments 19.1-19.4 in the exemplary embodiment shown in FIG. 1. Alternatively, the cutting subsections 16.1-16.4 may have one cutting segment or more than two cutting segments. In the decision about how many cutting segments are connected to the ring subsection 18.1-18.4, various boundary conditions must be taken into account. These include in particular the maximum length of the cutting segments that can be produced, which depends on the manufacturing method used, and the removal of the cooling and drilling fluid. In the case of core drilling, a cooling and drilling fluid is necessary, to cool the cutting segments 19.1-19.4 as a cooling fluid and to carry away the drilling fines as a drilling fluid. Clean cooling and drilling fluid is supplied through an internal gap between the drill core and the drill shaft section 12 and spent cooling and drilling fluid mixed with drilling fines is removed through an outside gap between the drill shaft section 12 and the borehole. The removal of cooling and drilling fluid is supported through gaps provided between the individual cutting segments 19.1-19.4 of a ring subsection 18.1-18.4 and/or between the ring subsections 18.1-18.4.

The drill bit 10 has a circular cross section in a plane perpendicular to the drilling axis 23. Alternatively, drill bits according to the invention may have other suitable cross sections, such as a polygonal cross section, for example. In the case of a polygonal cross section of the drill bit 10, it is advisable to mount a cutting subsection on each side of the polygon.

Figure 2:
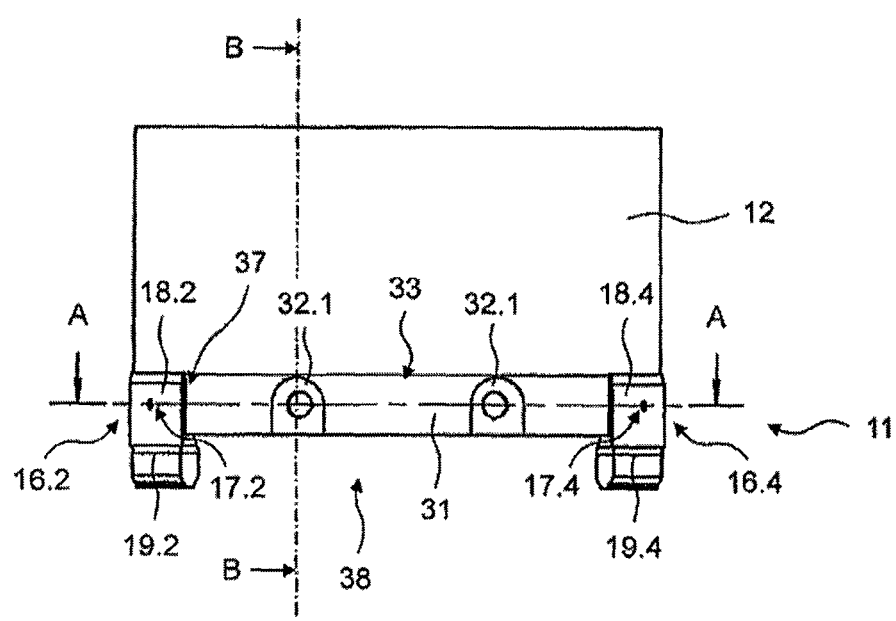
FIG. 2 shows the drill shaft section of the drill bit illustrated in FIG. 1, where the drill shaft section is connected to two cutting subsections by way of combined plug-and-pin connections.

FIG. 2 shows the drill shaft section 12 of the drill bit 10 illustrated in FIG. 1 with two cutting subsections which are connected to the drill shaft section 12 by means of combined plug-and-pin connections. The second and fourth cutting subsections 16.2, 16.4 are attached to the drill shaft section 12 by means of the combined plug-and-pin connections 17.2, 17.4, whereas the first and third cutting subsections 16.1, 16.3 are not connected to the drill shaft section 12.

The drill shaft section 12 has a plug connection section 31 which is provided on the side of the drill shaft section 12 facing the cutting section 11. In the plug connection section 31, two grooves 32.1-32.4, each of which forms a plug connection with corresponding journals on the cutting subsections 16.1-16.4 are provided for each cutting subsection 16.1-16.4. The plug connection section 31 and the grooves 32.1-32.4 are referred to jointly as the first plug connection element 33 of the drill shaft section 12.

Figure 3A:
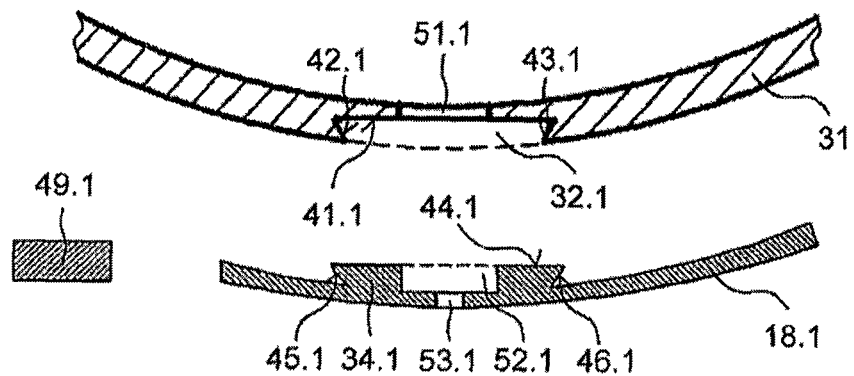
FIGS. 3A-C show the drill shaft section and the first cutting subsection of the drill bit illustrated in FIG. 1 in a cross section perpendicular to the drilling axis along sectional plane A-A in FIG. 2 in a non-connected state (FIG. 3A), in a plugged-in state with a plug connection (FIG. 3B) and in a connected state with the combined plug-and-pin connection (FIG. 3C)
Figure 3B:
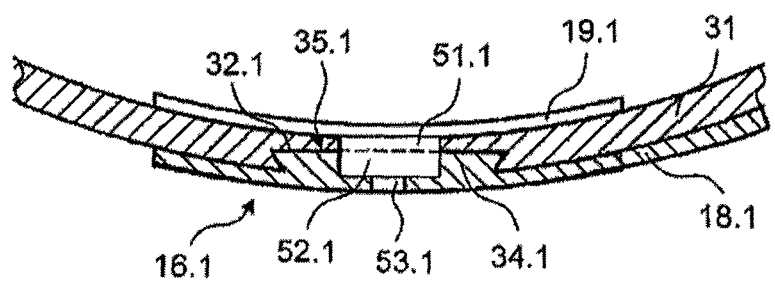
Figure 3C:
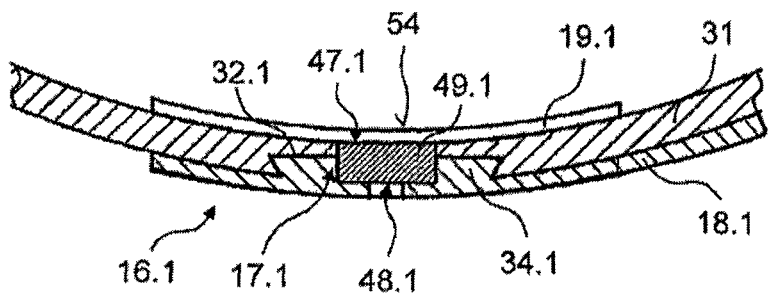

FIGS. 3A-C show the plug connection section 31 with the groove 32.1 and the first cutting subsection 16.1 with a journal 34.1 in a cross section perpendicular to the drilling axis 23 along a sectional plane A-A in FIG. 2 in an unconnected state (FIG. 3A), in a plugged-in state with a plug connection 35.1 between the groove 32.1 and the journal 34.1 (FIG. 3B) and in a connected state with the combined plug-and-pin connection 17.1 (FIG. 3C).

The combined plug-and-pin connection 17.1 of the first cutting subsection 16.1 illustrated in FIGS. 3A-C shows only one groove 32.1 and one journal 34.1. The discussion applies similarly for the second groove 32.1 and the second journal 34.1 of the combined plug-and-pin connection 17.1 of the first cutting subsection 16.1 and for the combined plug-and-pin connections 17.2-17.4 of the three additional cutting subsections 16.2-16.4. Each ring subsection 18.1-18.4 together with its journal 34.1-34.4 forms a plug subsection 36.1-36.4. The four plug subsections 36.1-36.4 are referred to jointly as the second plug connection element 37 of the cutting section 11 and the second plug connection element 37 together with the first plug connection element 33 of the drill shaft section 12 forms a plug connection 38 (see FIG. 2).

The groove 32.1 and the journal 34.1 are designed in a trapezoidal shape perpendicular to the drilling axis 23. The trapezoidal groove 32.1 is designed with equal legs and has an inner base surface 41.1 and two inner leg surfaces 42.1, 43.1. The trapezoidal journal 34.1 is also designed with equal legs and has an outer base surface 44.1 and two outer leg surfaces 45.1, 46.1. The plug connection section 31 is designed to be monolithic with the drill shaft section 12, and the journal 34.1 is designed to be monolithic with the ring subsection 18.1. As an alternative to the monolithic design, the journal 34.1 and/or the plug connection section 31 may be designed as separate parts and then joined to the ring subsection 18.1 and/or to the drill shaft section 12.

In the plugged-in state (FIG. 3B), the groove 32.1 and the journal 34.1 form the plug connection 35.1 which is designed as a form-fitting tongue-and-groove connection and secure the cutting subsection 16.1 against rotation about the drilling axis 23. The fit of the groove 32.1 and the journal 34.1 is designed so that there can be a transfer of torque from the drill shaft section 12 to the cutting section 11, and the journal 34.1 can be moved opposite the plugging direction to replace the cutting subsection 16.1.

To prevent a translation of the cutting subsection 16.1 in the drilling direction 24, the groove 32.1 and the journal 34.1 are additionally joined to one another by means of a pin connection 47.1 (FIG. 3C). The pin connection 47.1 comprises a receiving bore 48.1 and a pin element 49.1, which is plugged into the receiving bore 48.1. The receiving bore 48.1 consists of a through-bore 51.1 which passes completely through the plug connection section 31, and a blind hole 52.1 which partially passes through the ring subsection 18.1 (FIGS. 3A, B). The receiving bore 48.1 is designed as a blind hole 52.1 in the ring subsection 18.1 to prevent the pin element 49.1 from falling out of the receiving bore 48.1. The diameter of the pin elements 49.1-49.4 and the respective receiving bores 48.1-48.4 are coordinated with one another. The receiving bores 48.1-48.4 are designed to be as deep as or deeper than the pin elements 49.1-49.4. This ensures that the pin elements 49.1-49.4 do not protrude with respect to the inside or outside. The blind hole 52.1 is connected to the outside 54 of the drill bit 10 by means of an opening 53.1. The pin element 49.1 is accessible from the outside 54 through the opening 53.1 and can be forced out of the receiving bore 48.1 with a suitable tool, for example, so that the pin connection 47.1 can be released easily.

Figure 4A:
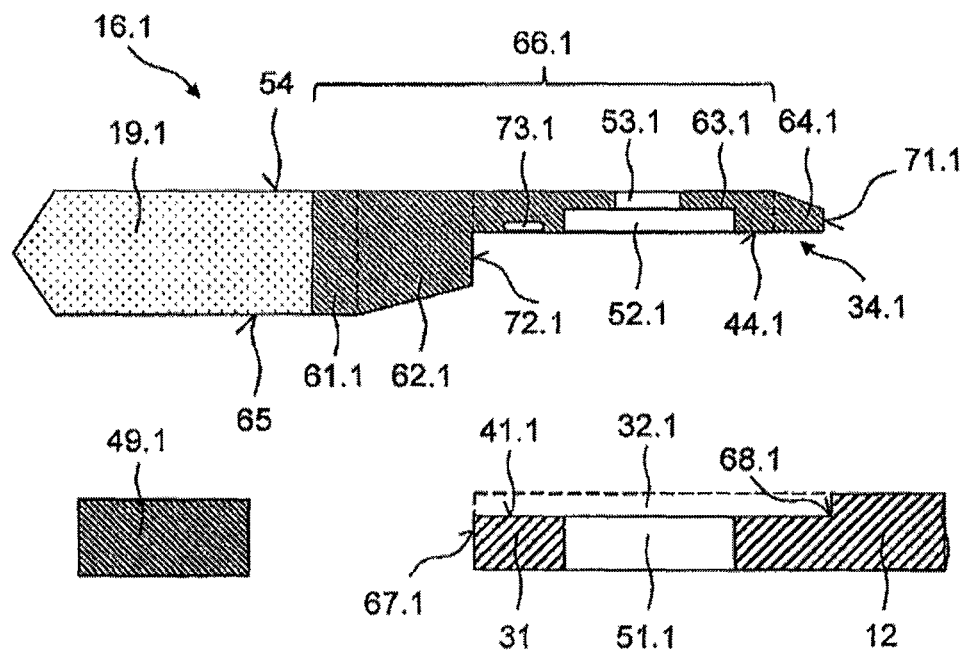
FIGS. 4A, B show the drill shaft section and the first cutting subsection of the drill bit illustrated in FIG. 1 in a longitudinal section parallel to the drilling axis of the drill bit along the sectional plane B-B in FIG. 2 in an unconnected state (FIG. 4A) and in a connected state (FIG. 4B).
Figure 4B:
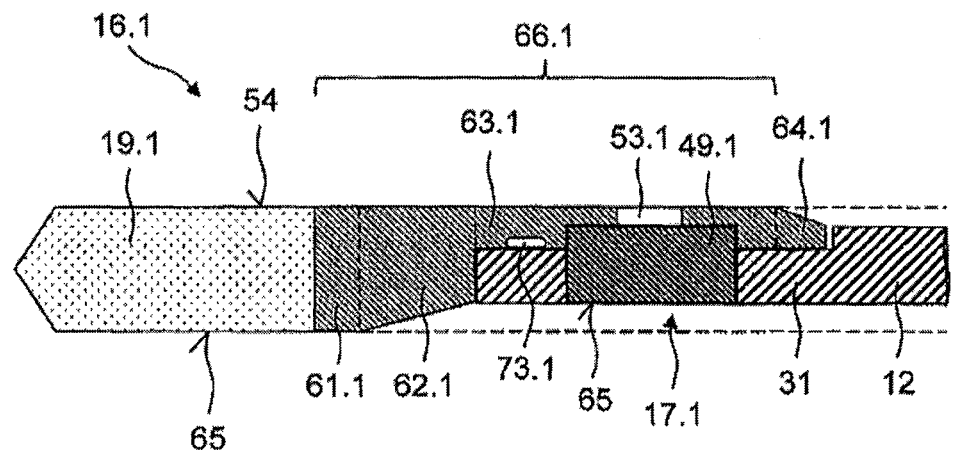

FIG. 4A, B show the plug connection section 31 with the groove 32.1 and the first cutting subsection 16.1 with the journal 34.1 in a longitudinal section parallel to the drilling axis 23 along a sectional plane B-B in FIG. 2 in an unconnected state (FIG. 4A) and in a connected state with the combined plug-and-pin connection 17.1 (FIG. 4B).

The ring subsection 18.1 consists of four sections in the drilling direction 24, namely a first ring section 61.1 having a constant inside diameter, a second ring section 62.1 having an inside diameter that decreases in the direction of the cutting segments 19.1, a connecting section 63.1 and a transitional section 64.1. The cutting segments 19.1 are attached to the first ring section 61.1. In the exemplary embodiment shown here, the first ring section 61.1 is connected to the cutting segments 19.1 and is flush with the outside 54 and the inside 65 of the drill bit 10. The second ring section 62.1 serves to support the removal of the drill core and is also referred to as the core removal section. A beveled transitional section 64.1 has the advantage that a drill bit 10, which has been clamped in the borehole, can be removed from the borehole more easily because of the lower resistance.

The first ring section 61.1, the second ring section 62.1, and the connecting section 63.1 have a constant outside diameter, which corresponds to the outside diameter of the cutting segments 19.1 and form a guide for the cutting segments 19.1 in drilling with the drill bit 10. The sections 61.1-63.1 on the outside 54 are referred to jointly as the guide section 66.1. Alternatively, the guide section 66.1 may be formed only from the first ring section 61.1 or from the first and second ring sections 61.1, 62.1. The first ring section 61.1 may also be omitted and/or the height of the first ring section 61.1 may be infinitesimally small. In this case, the second ring section 62.1 has an inside diameter at the connection to the cutting segments 19.1 which corresponds to the inside diameter of the cutting segments 19.1, and the outside surface of the second ring section 62.1 forms the guide section 66.1.

The guide section 66.1 becomes worn due to friction in the machining with the drill bit 10 from the substrate to be drilled. The arrangement of the guide section 66.1 on the replaceable cutting subsection 16.1 has the advantage that the guide section 66.1 is replaced regularly and ensures good guidance properties for the cutting segments 19.1. The height of the guide section 66.1 is selected so that on the one hand the cutting segments 19.1 are guided in drilling and, on the other hand, the cooling and drilling fluid can be transported in the borehole.

Instead of a drill bit 10 with guide sections 66.1-66.4, a traditional ring section may also be provided in which the cutting segments 19.1-19.4 have the same protrusion on the inside and outside. The embodiment of the drill bit 10 shown here with the guide sections 66.1-66.4 has the advantage that more material is available for the design of the grooves 32.1-32.4 and journals 34.1-34.4, which simplifies the production of the grooves 32.1-32.4 and the journals 34.1-34.4 (plug connections 35.1-35.4).

The first cutting subsection 16.1 is plugged with the journal 34.1 into the groove 32.1 of the drill shaft section 12. The groove 32.1 comprises an end face 67.1 and a contact face 68.1, in addition to the inner base surface 41.1 and the inner leg surfaces 42.1, 43.1. The journal 34.1 also comprises an end face 71.1 and a contact surface 72.1, in addition to the outer basic surface 44.1 and the outer leg surfaces 45.1, 46.1. The groove 32.1 is designed to be longer than the journal 34.1. The difference in length between the groove 32.1 and the journal 34.1, this ensures that the end face 67.1 of the groove 32.1 is in contact with the contact surface 72.1 of the journal 34.1 and that there is a gap between the end face 71.1 of the journal 34.1 and the contact surface 68.1 of the groove 32.1.

To maintain the functionality of the plug connection 35.1, the first cutting subsection 16.1 has a recess 73.1, which is filled with an anticorrosion agent before the assembly of the drill bit 10. Alternatively or additionally, a recess which holds an anticorrosion agent may be provided in the plug connection section 31 of the drill shaft section 12.

The first connection 14 between the cutting section 11 and the drill shaft section 12 must connect the cutting section 11 and the drill shaft section 12 to one another in all translatory and rotational directions. The replaceable cutting section 11 must be secured against translational movement in the drilling direction 24, opposite the drilling direction 24 and radially to the drilling direction 24, as well as being secured against rotation about the drilling axis 23. The plug connections 35.1-35.4 secure the cutting subsections 16.1-16.4 against translational movement opposite the drilling direction 24 and radially to the drilling direction 24. The pin connections 47.1-47.4 prevent rotation about the drilling axis 23 and translation in the drilling direction 24. For the pin connections 47.1-47.4, there is the additional requirement that the pin elements 49.1-49.4 are secured in the receiving boreholes 48.1-48.4 during the drilling operation and cannot be loosened from the receiving boreholes 48.1-48.4. If the pin elements 49.1-49.4 are loosened from the receiving boreholes 48.1-48.4 during the drilling operation, the cutting subsections 16.1-16.4 are not secured against translation in the drilling direction 24 or rotation about the drilling axis 23.

To reduce the risk that the pin elements 49.1-49.4 might become loosened and fall out of the receiving boreholes 48.1-48.4, an additional securing mechanism is provided for the pin elements 49.1-49.4. This securing mechanism may be provided, for example, by adhesive bonding or soldering of the pin elements 49.1-49.4 in the receiving boreholes 48.1-48.4 or the pin elements 49.1-49.4 may be designed as magnetic pin elements, as screws or as rivets. Alternatively, the pin elements 49.1-49.4 are secured by means of additional elements, such as an adhesive tape or a spring ring in the receiving boreholes 48.1-48.4, where the adhesive tape and the spring ring function as retaining elements.

In the exemplary embodiment of FIGS. 4A, B, the pin connections 47.1-47.4 of the drill bit 10 are designed to be magnetic. The pin elements 49.1-49.4 here are designed as permanent magnets, and the plug-connecting section 31 is designed to be ferromagnetic. Alternatively, the plug-connecting section 31 may be designed as a permanent magnet, and the pin elements 49.1-49.4 may be designed to be ferromagnetic. In the case of a magnetic pin connection, the bottom of the blind hole forms a magnetic mating surface to the pin element. The journals 34.1-34.4 may be made of a ferromagnetic material or some other material such as a plastic, for example.

A cutting subsection 16.1-16.4, in which the cutting segments 19.1-19.4 are worn, can be replaced with a new cutting subsection 16.1-16.4 easily and quickly by the user. To remove the worn cutting subsection 16.1-16.4, the pin elements 49.1-49.4 are removed from the receiving boreholes 48.1-48.4 through the openings 53.1-53.4, and the worn cutting subsection 16.1-16.4 is removed from the drill shaft section 12 in the direction opposite the plug-in direction. The new cutting subsection 16.1-16.4 is inserted with the journals 34.1-34.4 into the grooves 32.1-32.4 on the drill shaft section 12 until the end face 67.1-67.4 of the plug-connecting section 31 is in contact with the contact surface 72.1-72.4 of the new cutting subsection 16.1-16.4. Next, the pin elements 49.1-49.4 are inserted into the receiving boreholes 48.1-48.4 through the through-holes in the drill shaft section 12.

The invention claimed is:

1. A drill bit which is rotatable about a drilling axis, comprising:
    a drill shaft section having a first plug-connecting element; and a cutting section having a second plug-connecting element;

wherein the first plug-connecting element and the second plug-connecting element form a plug connection with an inner plug-connecting element and an outer plug-connecting element, wherein the inner plug-connecting element is closer to the drilling axis than the outer plug-connecting element and the outer plug-connecting element is farther away from the drilling axis than the inner plug-connecting element in a plane perpendicular to the drilling axis;

wherein the cutting section includes a plurality of cutting subsections each having a ring subsection and at least one cutting segment, wherein each ring subsection together with the first plug-connecting element forms the plug connection and is connectable to the first plug-connecting element by a pin connection;

wherein each pin connection has a receiving borehole and a pin element, wherein the pin element is insertable into the receiving borehole, wherein the pin element is a loose pin element, wherein the receiving borehole passes completely through one of the first and second plug-connecting elements and Passes at least partially through an other of the first and second plug-connecting elements;

wherein the receiving borehole is at least as deep as the pin element.

2. The drill bit according to claim 1, wherein a recess, which is filled with an anticorrosion agent, is provided in one or more of the ring subsections and/or in the first plug-connecting element.

3. The drill bit according to claim 1, wherein the receiving borehole does not pass completely through the other plug-connecting element.

4. The drill bit according to claim 1, wherein the receiving borehole passes completely through the other plug-connecting element.

5. The drill bit according to claim 1, wherein the pin connection is a releasable connection.

6. The drill bit according to claim 1, wherein the pin connection is a magnetic pin connection and wherein a pin element or one of the first and second plug-connecting elements is a permanent magnet.

7. The drill bit according to claim 1, wherein the pin element is clampable in the receiving borehole.

8. The drill bit according to claim 1, wherein an outside diameter of the drill shaft section is smaller than an outside diameter of the cutting segments, wherein an inside diameter of the drill shaft section is greater than an inside diameter of the cutting segments, wherein guide sections are disposed between the cutting segments and the drill shaft section, and wherein the guide sections are connected to the cutting segments such that the guide sections are at least partially flush with an outside and/or an inside of the drill bit.

9. The drill bit according to claim 8, wherein the guide sections are connected to the cutting segments such that the guide sections are at least partially flush with the outside and form a portion of the second plug-connecting element.

10. The drill bit according to claim 8, wherein the guide sections are connected to the cutting segments such that the guide sections are at least partially flush with the inside and form a portion of the first plug-connecting element.

11. A drill bit which is rotatable about a drilling axis, comprising:

a drill shaft section having a first plug-connecting element; and a cutting section having a second plug-connecting element;

wherein the first plug-connecting element and the second plug-connecting element form a plug connection;

and wherein the cutting section includes a plurality of cutting subsections each having a ring subsection and at least one cutting segment, wherein each ring subsection together with the first plug-connecting element forms the plug connection and is connectable to the first plug-connecting element by a pin connection;

wherein each pin connection has a receiving borehole and a pin element and wherein the pin element is insertable into the receiving borehole;

wherein the receiving borehole passes completely through one of the first and second plug-connecting elements and passes at least partially through an other of the first and second plug-connecting elements;

wherein the receiving borehole does not pass completely through the other plug-connecting element;

wherein the other plug-connecting element has an opening which connects the receiving borehole to an inside or an outside of the drill bit and wherein the opening is smaller than the receiving borehole.

* * * * *